United States Patent
Kakehi

(10) Patent No.: US 8,892,073 B2
(45) Date of Patent: Nov. 18, 2014

(54) MOBILE APPARATUS

(75) Inventor: Sakiko Kakehi, Kanagawa (JP)

(73) Assignee: NEC Casio Mobile Communications Ltd., Kanagawa (JP)

(*) Notice: Subject to any disclaimer, the term of this patent is extended or adjusted under 35 U.S.C. 154(b) by 0 days.

(21) Appl. No.: 13/822,967

(22) PCT Filed: Sep. 6, 2011

(86) PCT No.: PCT/JP2011/070249
§ 371 (c)(1),
(2), (4) Date: Mar. 13, 2013

(87) PCT Pub. No.: WO2012/053289
PCT Pub. Date: Apr. 26, 2012

(65) Prior Publication Data
US 2013/0183939 A1  Jul. 18, 2013

(30) Foreign Application Priority Data
Oct. 19, 2010  (JP) .................. 2010-234606

(51) Int. Cl.
*H04W 12/08* (2009.01)
*H04M 1/60* (2006.01)
*H04R 1/10* (2006.01)
*H04M 1/67* (2006.01)

(52) U.S. Cl.
CPC .......... *H04W 12/08* (2013.01); *H04M 2250/12* (2013.01); *H04M 1/6066* (2013.01); *H04R 1/1041* (2013.01); *H04M 1/67* (2013.01)
USPC .......................................... 455/411; 455/410

(58) Field of Classification Search
CPC .......... H04W 12/08; H04W 12/00; H04R 1/10
USPC .......... 455/411, 410, 41.1, 41.2, 556.1, 556.2, 455/557; 381/370
See application file for complete search history.

(56) References Cited

U.S. PATENT DOCUMENTS

2007/0160255 A1* 7/2007 Cheng et al. .................. 381/384
2010/0197273 A1* 8/2010 Uchida .......................... 455/411

FOREIGN PATENT DOCUMENTS

| JP | 2000-182310 A | 6/2000 |
| JP | 2004-153350 A | 5/2004 |
| JP | 2004-297256 A | 10/2004 |
| JP | 2007-288519 A | 11/2007 |
| JP | 2008-289033 A | 11/2008 |
| JP | 2009-027568 A | 2/2009 |
| JP | 2010-085868 A | 4/2010 |
| WO | 2008/032493 A1 | 3/2008 |

* cited by examiner

*Primary Examiner* — Kashif Siddiqui
(74) *Attorney, Agent, or Firm* — Sughrue Mion, PLLC

(57) ABSTRACT

After mount judging unit (110) transits from a state wherein it decides that earphone (200) is not mounted in an ear to a state wherein it decides that earphone (200) is mounted in the ear, if operating unit (120) accepts a preset unlocking operation, then valid/invalid setter (130) makes a setting for validating operations which will subsequently be accepted by operating unit (120). Valid/invalid setter (130) will keep the setting until mount judging unit (110) decides that earphone (200) is not mounted in the ear. If valid/invalid setter (130) makes the validating setting, controller (140) controls mobile device (100) depending on operations accepted by operating unit (120).

6 Claims, 4 Drawing Sheets

MOBILE APPARATUS

CROSS REFERENCE TO RELATED APPLICATIONS

This application is a National Stage of International Application No. PCT/JP2011/070249 filed Sep. 6, 2011, claiming priority based on Japanese Patent Application No. 2010-234606, filed Oct. 19, 2010, the contents of all of which are incorporated herein by reference in their entirety.

FIELD OF THE INVENTION

The present invention relates to a mobile device, an operation control method, and a program for controlling the mobile device to judge whether or not an operation made from outside of the mobile device is valid.

BACKGROUND ART

In recent years, some mobile devices incorporate a function referred to as "security lock function". The "security lock function" is a function to automatically set a mobile device to a mode for rejecting inputting operations from button keys and a touch panel on the mobile device, i.e., a mode for invalidating inputting operations (keeping the mobile device locked), if the mobile device has not been operated for a given period of time. The security lock function has been developed for protecting many items of private information stored in recent mobile devices from third parties.

A mobile device with the security lock function is set to a locked state if it has not been operated for a certain period of time even when the user (other than the third parties) is using the mobile device.

For example, while the user is listening to music on the mobile device, the mobile device is set to a locked state when a certain period of time elapses. In order for the user to validate an inputting operation to fast-forward the content or change the sound volume subsequently, the user needs to make an operation to unlock the mobile device, which is a rather troublesome task.

There has been developed a technology for solving the above problem (see Patent Literature 1, for example). According to the technology, if the user wants to listen to music using a terminal device and a unit device (e.g., a headset with a near-range wireless communication capability), then while music data are being sent from the terminal device to the unit device, the terminal device is set to an unlocked state. When the terminal device and the unit device have not been connected continuously for a certain period of time, or when music data have not been sent from the terminal device to the unit device for a certain period of time, the terminal device is set to a locked state.

PATENT LITERATURE

Patent Citation 1 PC(WO)2008/032493, Pamphlet

According to the technology disclosed in Patent Citation 1, if the unit device is loaned to a third party while music data are being sent from the terminal device to the unit device, then the terminal device may not be locked, possibly allowing information stored in the terminal device to be leaked. For example, while the user is listening to music with the mobile device that is connected to an earphone, if the user loans the earphone to a third party with music being played, then the terminal device is not locked, and information stored in the terminal device may be leaked.

It is an object of the present invention to provide a mobile device, an operation control method, and a program which will solve the above problems.

According to the present invention, there is provided a mobile device connectable to an earphone to be mounted in an ear, comprising:

a mount judging unit for judging whether or not the earphone is mounted in an ear;

an operating unit for accepting an operation from outside of the mobile device;

a valid/invalid setter for making a setting to confirm whether the operation accepted by the operating unit is valid or invalid; and a controller for controlling the mobile device depending on operations accepted by the operating unit while the valid/invalid setter is making a setting for validating operations;

wherein after mount judging unit transitions from a state wherein it decides that the earphone is not mounted in the ear to a state wherein it decides that the earphone is mounted in the ear, if the operating unit accepts a preset unlocking operation, then the valid/invalid setter makes a setting for validating operations which will subsequently be accepted by the operating unit, and will keep the setting until the mount judging unit decides that the earphone is not mounted in the ear.

According to the present invention, there is also provided an operation control method for controlling a mobile device connectable to an earphone to be mounted in an ear to judge whether an operation made from outside of the mobile device is valid or invalid, comprising:

judging whether or not the earphone is mounted in an ear;
accepting an operation from outside of the mobile device;
making a setting to confirm whether the accepted operation is valid or invalid;
controlling the mobile device depending on the accepted operation while a setting is made for validating the operation;
after a transition is made from a state wherein it is decided that the earphone is not mounted in the ear to a state wherein it is decided that the earphone is mounted in the ear, if a preset unlocking operation is accepted, making a setting for validating operations which will subsequently be accepted; and
keeping the setting after the setting for validating operations is made until it is decided that the earphone is not mounted in the ear.

According to the present invention, there is further provided a program for enabling a mobile device connectable to an earphone to be mounted in an ear to carry out:

judging whether or not the earphone is mounted in an ear;
accepting an operation from outside of the mobile device;
making a setting to confirm whether the accepted operation is valid or invalid;
controlling the mobile device depending on the accepted operation while a setting is made for validating the operation;
after a transition is made from a state wherein it is decided that the earphone is not mounted in the ear to a state wherein it is decided that the earphone is mounted in the ear, if a preset unlocking operation is accepted, making a setting for validating operations which will subsequently be accepted; and
keeping the setting after the setting for validating operations is made until it is decided that the earphone is not mounted in the ear.

According to the present invention, as described above, a security lock function can be set on the mobile device depending on the manner in which the user uses the mobile device.

FIRST EXEMPLARY EMBODIMENT

Figure 1:
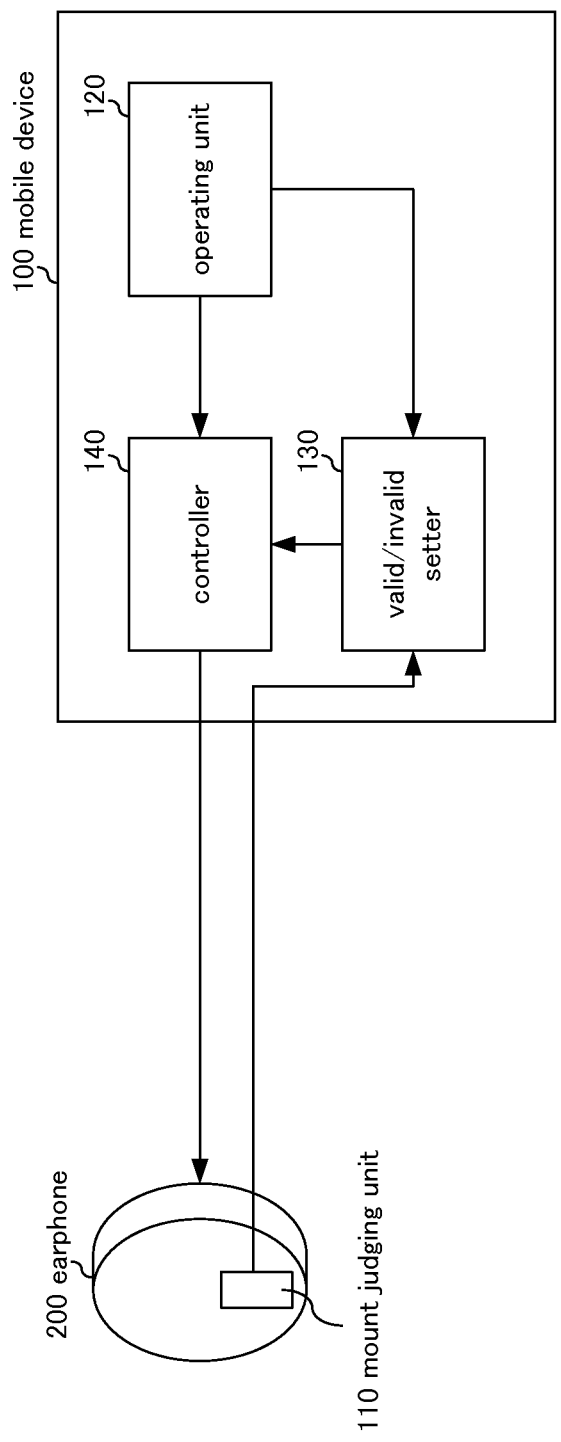
FIG. 1 is a diagram showing a mobile device according to a first exemplary embodiment of the present invention.

FIG. 1 is a diagram showing a mobile device according to a first exemplary embodiment of the present invention.

As shown in FIG. 1, mobile device 100 according to the first exemplary embodiment is connected to earphone 200 to be mounted in the ear of a user. Mobile device 100 includes mount judging unit 110, operating unit 120, valid/invalid setter 130, and controller 140. FIG. 1 shows only those components which are relevant to the present invention among the components of mobile device 100 that includes earphone 200.

Mobile device 100 may comprise a mobile audio player for playing back sounds of recorded music or the like, a mobile terminal having a function to play back sounds of music or the like.

Mount judging unit 110, which is disposed in earphone 200, judges whether or not earphone 200 is mounted in the ear of a user. Mount judging unit 110 may make a judgment using a temperature sensor or a contact sensor having a touch sensor function or the like. If a temperature sensor is used, for example, then when mount judging unit 110 detects a temperature equal to or higher than a preset threshold value, mount judging unit 110 may decide that earphone 200 is mounted in the ear. If a contact sensor is used, for example, then when mount judging unit 110 detects a contact, mount judging unit 110 may decide that earphone 200 is mounted in the ear. Mount judging unit 110 indicates the judgment result to valid/invalid setter 130.

Operating unit 120 accepts an operation made from outside of mobile device 100 by the user who operates mobile device 100. Operating unit 120 may comprise input buttons on mobile device 100, input switches, or an input means using a touch panel function. The user can use operating unit 120 to adjust the sound volume, and display, select, start playing back, stop playing back, fast-forward, and wind pieces of music. Operating unit 120 indicates the content of accepted operations to controller 140.

Valid/invalid setter 130 makes a setting as to whether an operation accepted by operating unit 120 is valid or invalid. Specifically, after mount judging unit 110 transitions from a state wherein it decides that earphone 200 is not mounted in the ear to a state wherein it decides that earphone 200 is mounted in the ear, if operating unit 120 accepts a preset unlocking operation, then valid/invalid setter 130 makes a setting for validating operations which will subsequently be accepted by operating unit 120. Thereafter, valid/invalid setter 130 will keep the setting (for validating operations) until mount judging unit 110 decides that earphone 200 is not mounted in the ear.

If mount judging unit 110 decides that earphone 200 is not mounted in the ear while valid/invalid setter 130 is keeping the validating setting, then valid/invalid setter 130 will make a setting for invalidating operations that will subsequently be accepted by operating unit 120. Since subsequent operations will be invalidated, mobile device 100 is locked for security.

Valid/invalid setter 130 indicates a validating or invalidating setting to controller 140.

Controller 140 has a security lock function. If controller 140 is notified of a validating setting from valid/invalid setter 130, then it controls mobile device 100 according to operations accepted by operating unit 120. If controller 140 is notified of an invalidating setting from valid/invalid setter 130, then it ignores (invalidates) operations accepted by operating unit 120.

"Unlocking operation" referred to above is an operation for making a setting for validating operations accepted by operating unit 120, and can be accepted regardless of a validating or invalidating setting made by valid/invalid setter 130. Although not described, the same holds true for a "locking operation" which is an operation for making a setting to lock mobile device 100 against operations, i.e., a setting for invalidating operations.

An operation control method according to the first exemplary embodiment shown in FIG. 1 will be described below.

Figure 2:
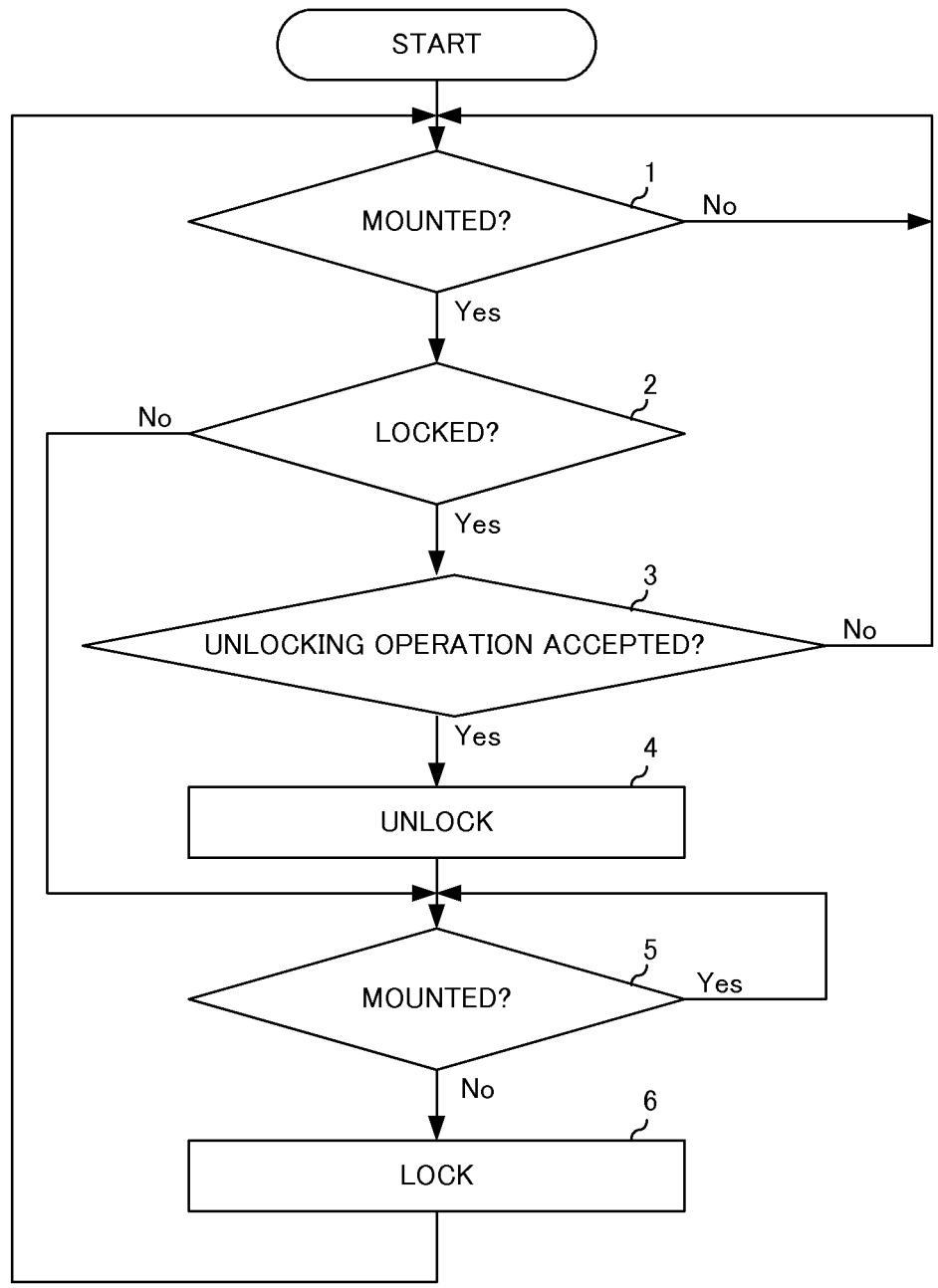
FIG. 2 is a flowchart of an operation control method according to the first exemplary embodiment of the present invention.

FIG. 2 is a flowchart of the operation control method according to the first exemplary embodiment which is illustrated in FIG. 1.

In step 1, mount judging unit 110 judges whether or not earphone 200 is mounted in the ear of the user.

If mount judging unit 110 decides that earphone 200 is mounted in the ear of the user, then valid/invalid setter 130 judges whether or not mobile device 100 is presently in a locked state, i.e., whether operations accepted by operating unit 120 are valid or invalid, in step 2.

If valid/invalid setter 130 decides that mobile device 100 is presently in a locked state, then valid/invalid setter 130 judges whether an unlocking operation is accepted by operating unit 120 or not in step 3. Valid/invalid setter 130 may judge whether or not an unlocking operation is accepted within a preset period.

If valid/invalid setter 130 decides that an unlocking operation is not accepted by operating unit 120, then the processing of step 1 is carried out.

If valid/invalid setter 130 decides that an unlocking operation is accepted by operating unit 120, then valid/invalid setter 130 unlocks mobile device 100 in step 4, thereby validating operations subsequently accepted by operating unit 120.

Thereafter, in step 5, mount judging unit 110 judges whether or not earphone 200 is mounted in the ear of the user. If valid/invalid setter 130 decides that mobile device 100 is not presently in a locked state in step 2, then the processing of step S5 is also carried out.

As long as mount judging unit 110 decides that earphone 200 is mounted in the ear of the user, valid/invalid setter 130 keeps mobile device 100 in the unlocked state. During this time, operations accepted by operating unit 120 are valid.

If mount judging unit 110 decides that earphone 200 is not mounted in the ear of the user in step 5, or specifically if mount judging unit 110 decides that earphone 200 is removed from the ear of the user, then valid/invalid setter 130 locks mobile device 100. In other words, operations accepted by operating unit 120 are invalidated by valid/invalid setter 130.

(Second Exemplary Embodiment)

Figure 3:
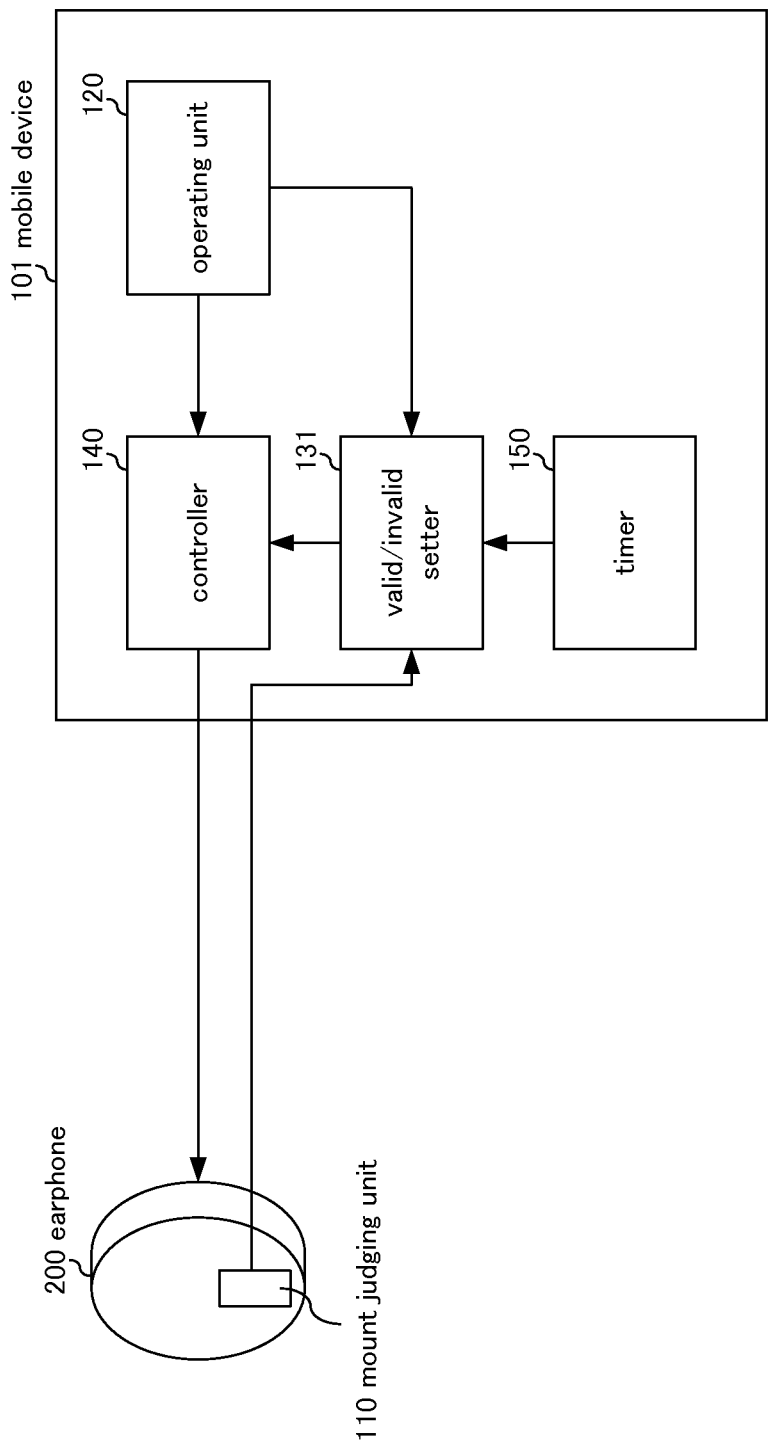
FIG. 3 is a diagram showing a mobile device according to a second exemplary embodiment of the present invention.

FIG. 3 is a diagram showing a mobile device according to a second exemplary embodiment of the present invention.

As shown in FIG. 3, mobile device 101 according to the second exemplary embodiment is connected to earphone 200 to be mounted in the ear of the user. Mobile device 101 includes mount judging unit 110, operating unit 120, valid/invalid setter 131, controller 140, and timer 150. FIG. 3 shows only those components which are relevant to the present invention among the components of mobile device 101 that includes earphone 200.

Mobile device 101 may comprise a mobile audio player for playing back sounds of recorded music or the like, a mobile terminal having a function to play back sounds of music or the like.

Mount judging unit 110, operating unit 120, and controller 140 are identical to those shown in FIG. 1.

Valid/invalid setter 131 makes a setting to confirm whether an operation accepted by operating unit 120 is valid or invalid. Specifically, after mount judging unit 110 transitions from a state wherein it decides that earphone 200 is not mounted in the ear to a state wherein it decides that earphone 200 is mounted in the ear, if operating unit 120 accepts a preset unlocking operation, then valid/invalid setter 131 makes a setting for validating operations which will subsequently be accepted by operating unit 120. Thereafter, if mount judging unit 110 decides that earphone 200 is not mounted in the ear, valid/invalid setter 131 will keep the setting (for validating operations) until a preset period elapses based on the decision of mount judging unit 110. Stated otherwise, after the state wherein mount judging unit 110 decides that earphone 200 is not mounted in the ear has subsequently continued for a preset period while valid/invalid setter 131 is keeping the validating setting, valid/invalid setter 131 makes a setting for invalidating operations accepted by operating unit 120. The "preset period" is a period set in timer 150, and measured using timer 150.

Valid/invalid setter 131 indicates a validating or invalidating setting to controller 140.

Timer 150 measures the preset (predetermined) period. Details of the operation of timer 150 will be described later.

"Unlocking operation" and "locking operation" are the same as those according to the first exemplary embodiment.

An operation control method according to the second exemplary embodiment shown in FIG. 3 will be described below.

Figure 4:
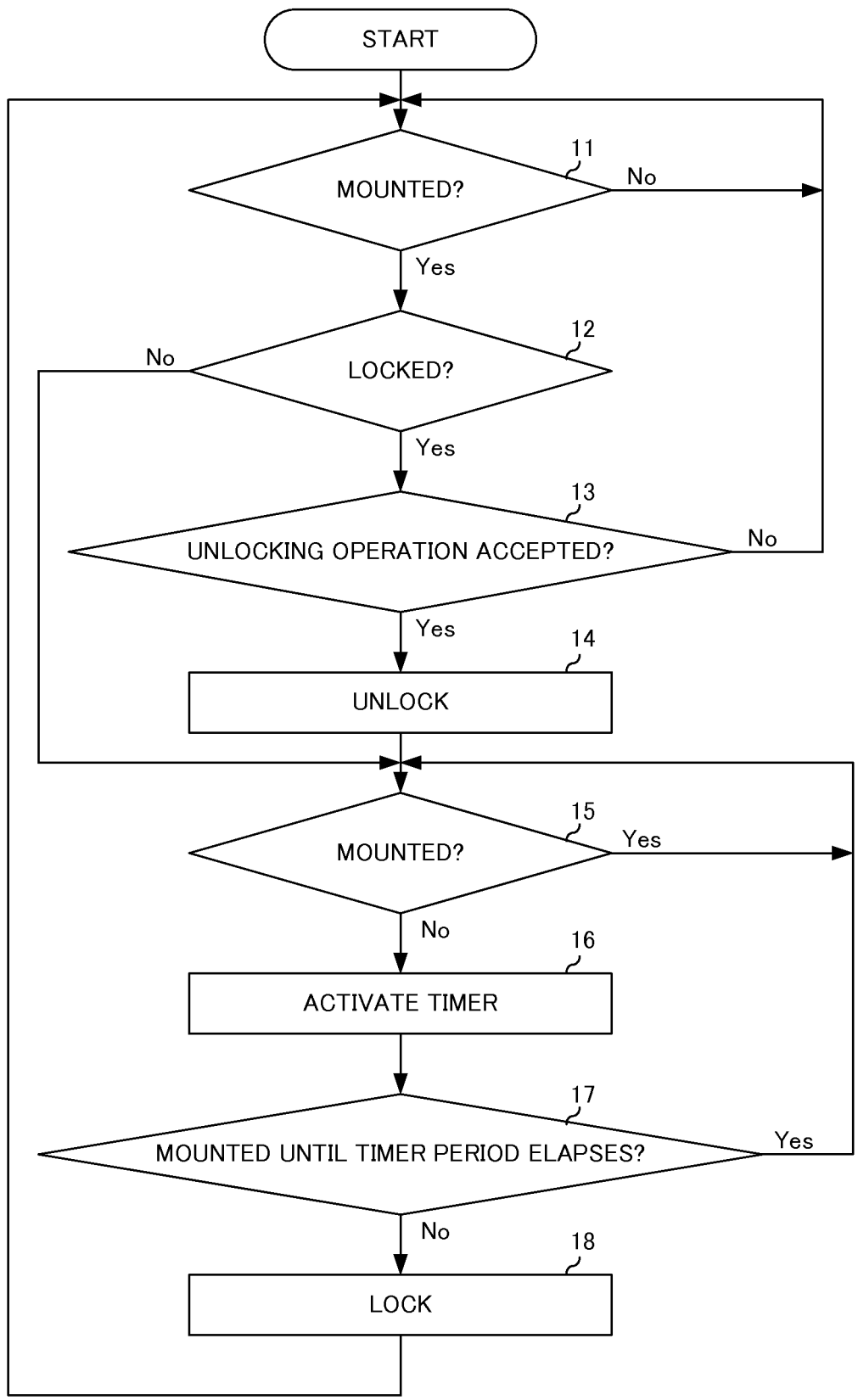
FIG. 4 is a flowchart of an operation control method according to the second exemplary embodiment of the present invention.

FIG. 4 is a flowchart of the operation control method according to the second exemplary embodiment which is illustrated in FIG. 3.

In step 11, mount judging unit 110 judges whether or not earphone 200 is mounted in the ear of a user.

If mount judging unit 110 decides that earphone 200 is mounted in the ear of a user, then valid/invalid setter 131 judges whether or not mobile device 101 is presently in a locked state, i.e., whether operations accepted by operating unit 120 are valid or invalid, in step 12.

If valid/invalid setter 131 decides that mobile device 100 is presently in a locked state, then valid/invalid setter 131 judges whether or not an unlocking operation is accepted by operating unit 120 in step 13. Valid/invalid setter 130 may judge whether or not an unlocking operation is accepted within a preset period. Timer 150 may be used to measure the preset period.

If valid/invalid setter 131 decides that an unlocking operation is not accepted by operating unit 120, then the processing of step 11 is carried out.

If valid/invalid setter 131 decides that an unlocking operation is accepted by operating unit 120, then valid/invalid setter 131 unlocks mobile device 101 in step 14, thereby validating operations subsequently accepted by operating unit 120.

Thereafter, in step 15, mount judging unit 110 judges whether or not earphone 200 is mounted in the ear of the user. If valid/invalid setter 131 decides that mobile device 101 is not presently in a locked state in step 12, then the processing of step S15 is also carried out.

As long as mount judging unit 110 decides that earphone 200 is mounted in the ear of the user, valid/invalid setter 131 keeps mobile device 100 in the unlocked state. During this time, operations accepted by operating unit 120 are valid.

If mount judging unit 110 decides that earphone 200 is not mounted in the ear of the user in step 15, or specifically if mount judging unit 110 decides that earphone 200 is removed from the ear of the user, then timer 150 is activated in step 16.

After timer 150 is activated and until the period set in timer 150 elapses, mount judging unit 110 judges whether or not earphone 200 is mounted in the ear of the user in step 17.

If mount judging unit 110 decides that earphone 200 is mounted in the ear of the user until the period set in timer 150 elapses, then the processing of step 15 is carried out.

If mount judging unit 110 decides that earphone 200 is not mounted in the ear of the user until the period set in timer 150 elapses, then valid/invalid setter 131 places mobile device 100 in a locked state in step 18. In other words, valid/invalid setter 131 invalidates operations accepted by operating unit 120.

Consequently, in view of the possibility that earphone 200 might have been removed from the ear, valid/invalid setter 131 locks mobile device 100 if the state wherein mount judging unit 110 decides that earphone 200 is not mounted in the ear has continued for the preset period.

In the first and second exemplary embodiments, the mobile device is locked or unlocked depending on whether or not earphone 200 is mounted in the ear. However, the mobile device may be locked or unlocked depending on whether or not mobile device 100 is connected to earphone 200, i.e., whether or not earphone 200 is inserted in mobile device 100. Specifically, if mobile device 100 is unlocked while earphone 200 is inserted in mobile device 100, then mobile device 100 may remain continuously unlocked as long as earphone 200 is inserted in mobile device 100, and if earphone 200 is pulled out of mobile device 100, then mobile device 100 may be locked.

As described above, the present invention offers the following advantages:

According to the first advantage, if the mobile device is unlocked while the earphone is mounted in the ear, the mobile device is not locked until the earphone is removed. The unlocking action of the user is thus eliminated, making it easy for the user to operate the mobile device.

According to the second advantage, when the earphone is removed, the mobile device is automatically locked without being noticed by the user.

Therefore, a security lock function can be set on the mobile device depending on the manner in which the user uses the mobile device.

The processing details performed by the components of mobile device 100, 101 may be carried out by logic circuits that are fabricated to meet certain purposes. Alternatively, a computer program (hereinafter referred to as "program") descriptive of the processing details as a processing sequence may be recorded in a recording medium that can be read by mobile device 100, 101, and the program recorded in the recording medium may be read and executed by mobile device 100, 101. The recording medium that can be read by mobile device 100, 101 may comprise a removable recording medium such as a floppy (registered trademark) disk, a magnetooptical disk, a DVD, a CD, or the like, or a memory such as a ROM, a RAM, or the like, or a HDD that is incorporated in mobile device 100, 101. The program recorded in the recording medium is read by a CPU (not shown) included in mobile device 100, 101, and run by the CPU to perform the same processes as described above. The CPU operates as a computer for executing the program that is read from the recording medium.

Although the present invention has been described with respect to the exemplary embodiments, the present invention is not limited to the above exemplary embodiments. Various changes that can be understood by those skilled in the art may be made to the configurations and details of the present invention within the scope of the present invention.

This application is based upon and claims the benefit of priority from Japanese Patent Application No. 2010-234606 filed on Oct. 19, 2010, the entire disclosure of which is incorporated herein by reference.

The invention claimed is:

1. A mobile device connectable to an earphone to be mounted in an ear, comprising:
    a mount judging unit for judging whether or not said earphone is mounted in an ear;
    an operating unit for accepting an operation from outside of the mobile device;
    a valid/invalid setter for making a setting to confirm whether the operation accepted by said operating unit is valid or invalid; and
    a controller for controlling the mobile device depending on operations accepted by said operating unit while said valid/invalid setter is making a setting for validating operations;
    wherein after mount judging unit transitions from a state wherein it decides that said earphone is not mounted in the ear to a state wherein it decides that said earphone is mounted in the ear, if said operating unit accepts a preset unlocking operation, then said valid/invalid setter makes a setting for validating operations which will subsequently be accepted by said operating unit, and will keep the setting until said mount judging unit decides that said earphone is not mounted in the ear.

2. The mobile device according to claim 1, wherein if said mount judging unit decides that said earphone is not mounted in the ear while said valid/invalid setter is keeping the setting for validating operations, said valid/invalid setter makes a setting for invalidating operations which will subsequently be accepted by said operating unit.

3. The mobile device according to claim 2, wherein if the state wherein said mount judging unit decides that said earphone is not mounted in the ear continues for a predetermined period, said valid/invalid setter makes a setting for invalidating operations accepted by said operating unit.

4. The mobile device according to claim 1, wherein said mount judging unit comprises a temperature sensor.

5. The mobile device according to claim 1, wherein said mount judging unit comprises a contact sensor.

6. An operation control method for controlling a mobile device connectable to an earphone to be mounted in an ear to judge whether an operation made from outside of the mobile device is valid or invalid, comprising:
    judging whether or not said earphone is mounted in an ear;
    accepting an operation from outside of the mobile device;
    making a setting to confirm whether the accepted operation is valid or invalid;
    controlling the mobile device depending on the accepted operation while a setting is made for validating the operation;
    after a transition is made from a state wherein it is decided that said earphone is not mounted in the ear to a state wherein it is decided that said earphone is mounted in the ear, if a preset unlocking operation is accepted, making a setting for validating operations which will subsequently be accepted; and
    keeping the setting after the setting for validating operations is made until it is decided that said earphone is not mounted in the ear.

* * * * *